United States Patent
Gum (10) Patent No.: US 9,603,188 B2
(45) Date of Patent: Mar. 21, 2017

(54) DYNAMIC CONNECTION MANAGEMENT

(75) Inventor: Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 654 days.

(21) Appl. No.: 12/352,779

(22) Filed: Jan. 13, 2009

(65) Prior Publication Data

US 2010/0177711 A1   Jul. 15, 2010

(51) Int. Cl.
  *H04W 76/02*   (2009.01)
  *H04W 88/06*   (2009.01)
  *H04W 48/18*   (2009.01)

(52) U.S. Cl.
  CPC ........... *H04W 88/06* (2013.01); *H04W 48/18* (2013.01)

(58) Field of Classification Search
  USPC ...................................................... 455/435.2
  See application file for complete search history.

(56) References Cited

U.S. PATENT DOCUMENTS

| | | | |
|---|---|---|---|
| 2004/0009751 A1* | 1/2004 | Michaelis et al. | 455/62 |
| 2006/0291385 A1* | 12/2006 | Yang | 370/229 |
| 2007/0160072 A1* | 7/2007 | Thalanany et al. | 370/401 |
| 2007/0286092 A1* | 12/2007 | Famolari et al. | 370/252 |
| 2008/0198811 A1* | 8/2008 | Deshpande et al. | 370/332 |
| 2010/0015973 A1* | 1/2010 | Islam | H04W 48/16 455/434 |
| 2010/0075665 A1* | 3/2010 | Nader et al. | 455/426.1 |
| 2010/0216468 A1* | 8/2010 | Kazmi et al. | 455/435.3 |
| 2012/0015689 A1* | 1/2012 | Phillips et al. | 455/552.1 |

FOREIGN PATENT DOCUMENTS

| | | |
|---|---|---|
| EP | 1740001 | 1/2007 |
| EP | 1843613 A1 | 10/2007 |
| EP | 1895800 A1 | 3/2008 |
| JP | 10190845 A | 7/1998 |
| JP | 2002112347 A | 4/2002 |
| JP | 2004159258 A | 6/2004 |
| JP | 2006504291 | 2/2006 |
| JP | 2007013989 A | 1/2007 |
| JP | 2008544596 A | 12/2008 |
| JP | 2009544262 | 12/2009 |

(Continued)

OTHER PUBLICATIONS

International Search Report and Written Opinion—PCT/US2010/020904—ISAEPO—Feb. 25, 2010.
Taiwan Search Report—TW099100846—TIPO—Feb. 26, 2013.

*Primary Examiner* — Mazda Sabouri
(74) *Attorney, Agent, or Firm* — Hyung Myung (57) ABSTRACT

Dynamic connection management of a network connection at an electronic communications device is disclosed. In an example, one or more connection criteria associated with connection establishment at the electronic communications device is determined at the electronic communications device. The electronic communications device determines a connection acquisition priority list based on current values of the one or more connection criteria, the connection acquisition priority list being a prioritized order of connection types. The electronic communications device attempts to establish a network connection based on the connection acquisition priority list.

23 Claims, 4 Drawing Sheets

(56) References Cited

FOREIGN PATENT DOCUMENTS

| JP | 2010502144 A | 1/2010 |
|----|---|---|
| JP | 2010510707 A | 4/2010 |
| WO | WO03100647 A1 | 12/2003 |
| WO | 2008011420 A1 | 1/2008 |
| WO | 2008025618 A1 | 3/2008 |
| WO | 2008059365 A2 | 5/2008 |

\* cited by examiner

DYNAMIC CONNECTION MANAGEMENT

FIELD OF DISCLOSURE

Aspects of the present invention are directed to establishing a network connection at an electronic communications device.

BACKGROUND

Historically, computers were configured to access networks, such as the Internet, via one particular connection type. For example, a desktop computer in the 1990s would typically access the Internet via a dial-up modem over a telephone line. Alternative connections to the Internet were typically not available. More recently, computers and other electronic communication devices (ECDs), cell phones, PDAs, etc., include multiple means of connecting to one or more networks. For example, it is not uncommon for a laptop computer to include (i) Bluetooth connectivity, (ii) 802.11 connectivity, (iii) connectivity to a cellular broadband service and/or (iv) connectivity to a wired dial-up or Ethernet connection.

Because ECDs can include multiple connection types, it is typical for ECDs to establish a connection acquisition priority list (CAPL) that indicates an order of connection types for a given ECD to attempt connection establishment. For example, the ECDs can direct users to configure the CAPL manually, which can be a relatively slow, cumbersome process that does not guarantee that the user will actually select an efficient CAPL. A conventional CAPL connection process will now be described with respect to FIG. 1.

Figure 1:
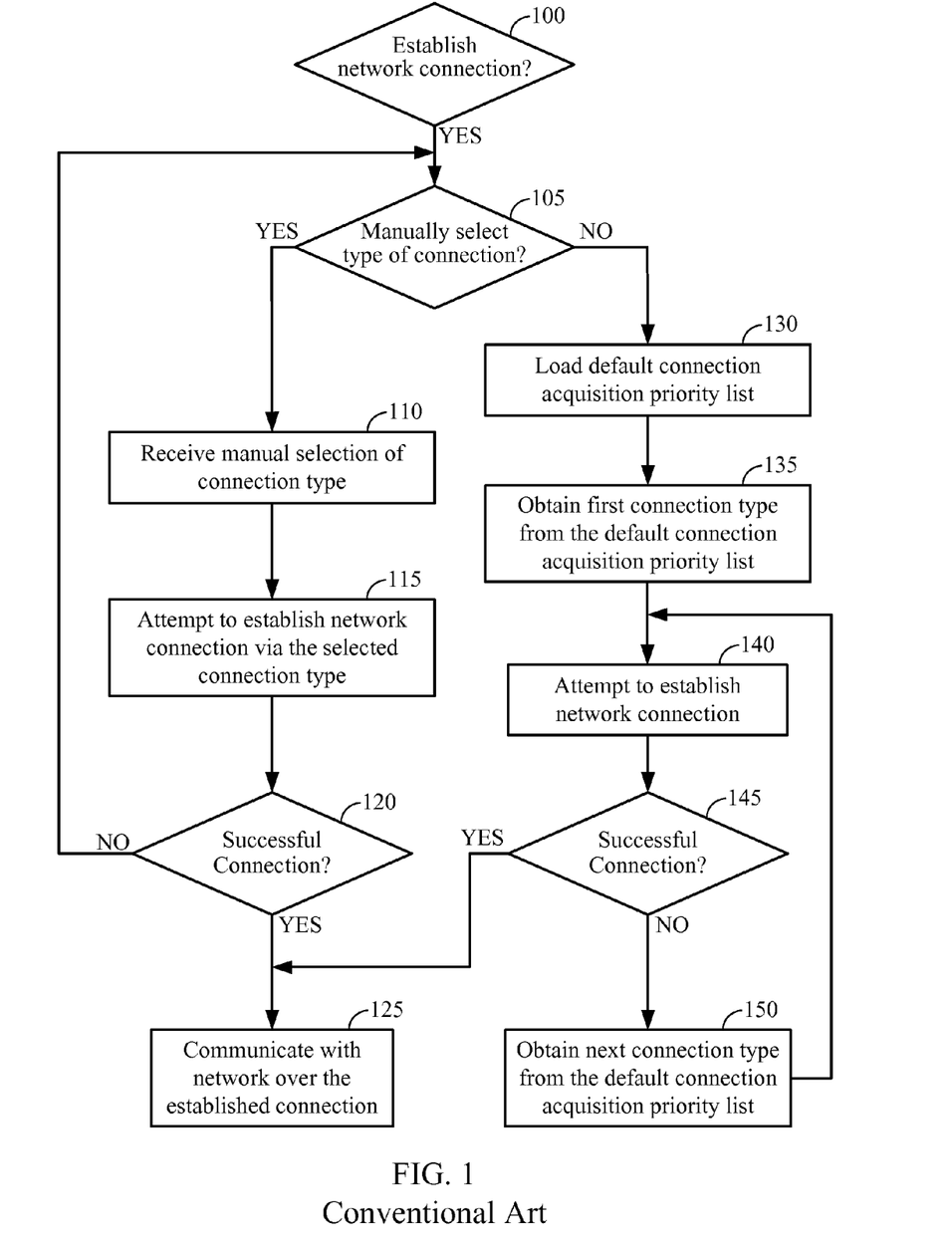
FIG. 1 illustrates a conventional network connection setup based on a default connection acquisition priority list (CAPL).

Referring to FIG. 1, in 100, an ECD determines whether to establish a network connection. For example, if the ECD is a laptop computer, the ECD may determine to establish a network connection if a user of the ECD instructs the ECD to launch an Internet browser. If the ECD determines to establish a network connection, the process advances to 105. In 105, the ECD determines whether the user of the ECD wishes to manually select the first connection type for the network connection attempt. The determination of 105 can be pre-configured at the ECD (e.g., automatically bypassed), or can be based on a user prompt. If the ECD determines to permit the user to manually select the connection type for the network connection attempt, the ECD prompts the user for the manual selection and receives an indication of a connection type selection in 110. For example, the user may click on one of a plurality of available WiFi networks to select the connection type.

Next, in 115, the ECD attempts to establish a network connection via the selected connection type. In 120, the ECD determines whether the connection attempt was successful. If the connection attempt was successful, the ECD may communicate with the network via the established connection, 125. Otherwise, if the connection attempt is not successful, the process returns to 105 and the user is again given the choice with regard to whether to try another manually selected connection type.

Returning to 105, if the ECD determines not to prompt the user for a manual connection type selection, the ECD loads a default connection acquisition priority list (CAPL), 130. As mentioned above, the default CAPL indicates an order of connection types for a given ECD to attempt connection establishment. The default CAPL is typically established in advance, and can be based on an expected usage of the ECD. For example, if the user of the ECD is frequently near free WiFi hotspots, the CAPL can be configured to grant the WiFi connection type a higher priority, such that more expensive connection types, such as a cellular broadband service, are not engaged. Similarly, within WiFi or other network technology, a predetermined, ordered list of systems is typically used to determine which system to connect to. Alternatively, the priority of connection types within the default CAPL can be based on other factors, such as power consumption.

Accordingly, after the default CAPL is loaded at the ECD in 130, a first connection type is obtained from the default CAPL, 135. The first connection type obtained from the default CAPL corresponds to the connection type having the highest priority (and/or having a first position on the list of connection types) in the default CAPL. Next, the ECD attempts to establish a network connection via the first connection type, 140. The ECD then determines whether the network connection attempt was successful, 145. If the network connection attempt is determined to be successful, the process advances to 125, which is described above. Otherwise, if the network connection attempt is determined not to be successful, the ECD obtains a next connection type from the default CAPL, 150. The next (i.e., second) connection type obtained from the default CAPL corresponds to the connection type having the next highest priority in the default CAPL as compared to the previously attempted connection type. The process then returns to 140 and a network connection attempt is performed for the next connection type, and so on, until all connection types in the default CAPL are tested or a successful connection is established.

As will be appreciated by one of ordinary skill in the art, the default CAPL may be a best guess of which connection types would be most efficient in expected usage situations, or alternatively the CAPL may be randomly selected based on the last connection type added, regardless of relative connection-type efficiency. Either way, the default CAPL lacks flexibility, and the manual entry solution forces the user to manually enter connection types. For example, default CAPLs do not take a current location of the ECD into account. Thus, if a user is driving across the country and different connection types would be preferred by the user or carrier network at different locations, the default CAPL is not able to adapt so as to automatically provide the user with the desired connection type at each location.

Figure 2:
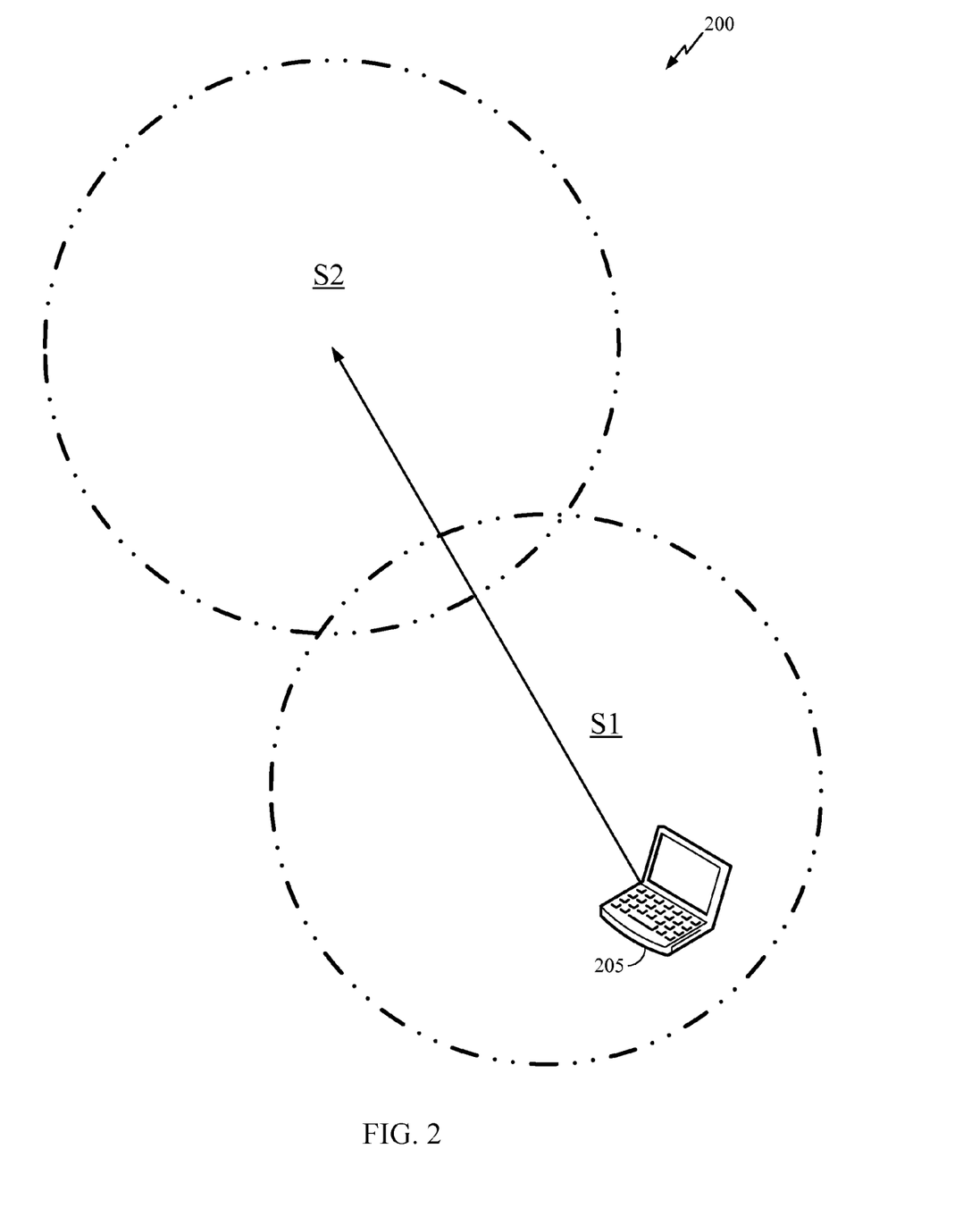
FIG. 2 illustrates a portion of a wireless communications network.

FIG. 2 illustrates a portion of a wireless communication system 200, and includes sectors S1 and S2. Further illustrated in FIG. 2 is an ECD (e.g., laptop computer 205) that is traveling from sector S1 to sector S2. For convenience of explanation, assume that the laptop computer 205 can connect to the Internet only via WiFi (e.g., 802.11a/b) or a cellular broadband connection. Sector S1 supports cellular broadband connectivity, but does not support WiFi. Sector S2 supports both cellular broadband connectivity and free WiFi connectivity.

With the above assumptions, in a first example, assume that the default CAPL grants WiFi a higher priority than cellular broadband. Accordingly, in sector S1, the laptop computer 205 loads the default CAPL, 130, determines WiFi to be the highest-priority connection type, 135, attempts to establish a WiFi connection, 140, determines the connection attempt to be unsuccessful, 145. After attempting the WiFi connection (i.e., searching for WiFi signals for a given period of time, requesting service from WiFi routers that deny service, etc.), the laptop computer 205 establishes the cellular broadband connection (150, 140, 145, 125). Thus, the initial WiFi attempt delays the network connection setup speed and also wastes power.

In a second example, assume that the default CAPL grants WiFi a lower priority than cellular broadband. Accordingly, in sector S1, the laptop computer 205 loads the default CAPL, 130, determines cellular broadband to be the highest-priority connection type, 135, attempts to establish a cellular broadband connection, 140, determines the connection attempt to be successful, 145, and communicates over the cellular broadband connection, 125. Next, the laptop computer 205 enters sector S2 from S1. At this point, even if the laptop computer 205 re-executes the process of FIG. 1, the laptop computer 205 will not switch to the free WiFi connection unless the cellular broadband connection is dropped by the carrier because cellular broadband has a higher priority than WiFi in the default CAPL. Thus, the failure to switch to the available WiFi connection is not ideal, in this case, for the user of the laptop computer 205.

In a third alternative example, assume that WiFi is available in Sector S2, but requires a fee to access. However, further assume that cellular broadband is available and, when not roaming, is available at a flat rate to which the user has already subscribed. Therefore, in this case the cellular broadband is cheaper since the user has already signed up for unlimited flat rate services. On the other hand, assume there is a charge when the user is roaming so that the default to cellular broadband when in roaming territory would be more expensive than using a free Internet café WiFi or a flat rate WiFi (e.g., a day rate). As will be appreciated, these factors make a static CAPL less likely to be ideal in all situations.

SUMMARY

An aspect of the present invention is directed to a method of establishing a network connection at an electronic communications device. In an example, one or more connection criteria associated with connection establishment at the electronic communications device is determined at the electronic communications device. The electronic communications device determines a connection acquisition priority list based on current values of the one or more connection criteria, the connection acquisition priority list being a prioritized order of connection types. The electronic communications device attempts to establish a network connection based on the connection acquisition priority list.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As discussed in the Background section, conventional electronic communication devices (ECDs) connect to networks based on either a manual user selection of a connection type or a connection type order listed in a default connection acquisition priority list (CAPL). However, the manual user selection is cumbersome, and the default CAPL does not necessarily achieve the best connection type for the user in all scenarios. Accordingly, aspects of the present invention are directed to a dynamic CAPL that is configured to change in response to one or more connection conditions. Further, as used herein, an ECD can be embodied as any electronic device capable of communicating with other networks (e.g., a laptop computer, a desktop computer, a cell phone, or personal digital assistant (PDA)). As will be appreciated, the communicative ability of the ECD need not be the primary function of the ECD, so long as the ECD is capable of the communication.

Figure 3:
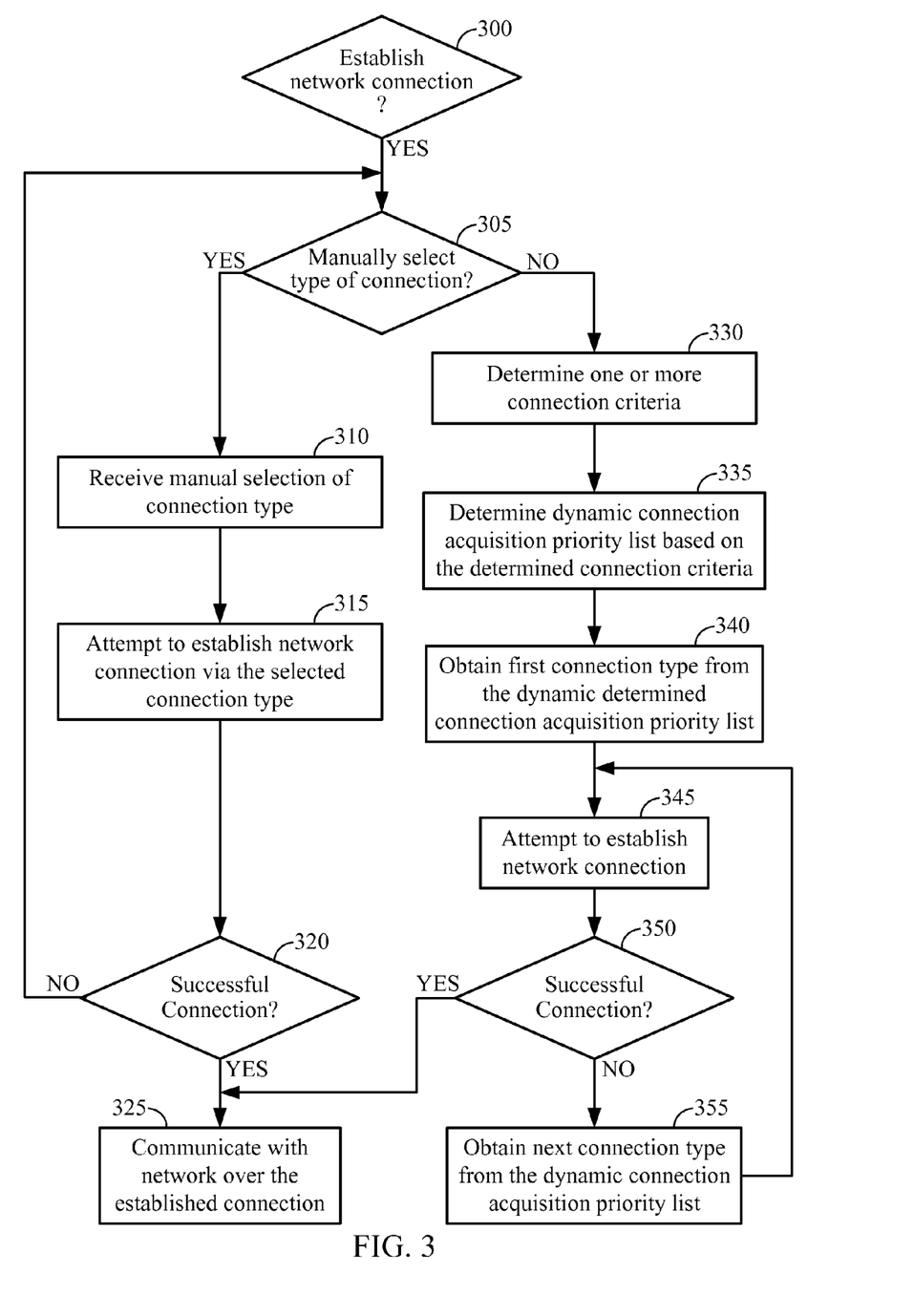
FIG. 3 illustrates a network connection setup based on a dynamic CAPL according to an aspect of the present invention.

FIG. 3 illustrates a network connection setup based on a dynamic CAPL according to an aspect of the present invention. Referring to FIG. 3, in 300, an ECD determines whether to establish a network connection. For example, if the ECD is a laptop computer, the ECD may determine to establish a network connection if a user of the ECD instructs the ECD to launch an Internet browser. As used herein, a "network connection" can mean an Internet connection, a connection to a wired phone line, a connection to a wireless cellular phone line, a WiFi (e.g., a 802.12a/b/g connection, an 802.16d/e connection, etc.), a connection between local wired or wireless peripheral devices (e.g., such as when multiple printers are available via different connection types, such as a USB interface or a 802.11b interface), and/or any other type of well-known wired or wireless network connection.

If the ECD determines to establish a network connection, the process advances to 305. In 305, the ECD determines whether the user of the ECD wishes to manually select the first connection type for the network connection attempt. The determination of 305 can be pre-configured at the ECD (e.g., automatically bypassed), or can be based on a user prompt. If the ECD determines to have the user manually select the connection type for the network connection attempt, the ECD prompts the user for the manual selection and receives an indication of a connection type selection, 310. For example, the user may click on one of a plurality of available WiFi networks to select the connection type.

Next, in 315, the ECD attempts to establish a network connection via the selected connection type. In 320, the ECD determines whether the connection attempt was successful. If the connection attempt was successful, the ECD may communicate with the network via the established connection, 325. Otherwise, if the connection attempt is not successful, the process returns to 305 and the user is again given the choice with regard to whether to try another manually selected connection type.

Returning to 305, if the ECD determines not to prompt the user for a manual connection type selection, the ECD determines current values of one or more connection criteria, 330. The connection criteria determined in 330 can be (i) configured by a user of the ECD at the actual ECD, or (ii) downloaded to the ECD from an external device (e.g., a remote server, a network database, a PC, etc.). Further, the configuring or downloading of the connection criteria can be performed in advance of the process of FIG. 3, or during step 330. Thus, if the configuring or downloading of the connection criteria are determined in advance of the process of FIG. 3, then 330 may include access one or more memory registers at the ECD that indicate the pre-configured or pre-downloaded connection criteria. As used herein, "current" can mean substantially contemporaneous with the network connection attempt. For example, the default CAPL discussed in the Background section is either pre-configured by the user (e.g., during an initial setup of the ECD), or by the carrier network (e.g., by a network administrator). Thus, the default CAPL could not be said to be based on current values of connection criteria. However, the term "current" should not be narrowly construed as to be the exact time of the connection attempt. Further, the connection criteria determined in 330 may include any type of criteria that can affect the selection of a given connection type among a plurality of connection types.

In an example, referring to 330 of FIG. 3, a connection criterion may be the location of the ECD. In a further example, the location of the ECD may be determined based on (i) which access points (APs) are observable to the ECD, (ii) an estimate of a position of the portable electronic device obtained via a positioning system (e.g., a satellite positioning system (SPS), GPS, network trilateration and/or a subnet associated with an internet protocol (IP) address of the gateway (or any other well-known positioning techniques) and/or (iii) any combination thereof. For example, if power usage is a priority for the ECD, the ECD may determine location based on a lowest power usage position determination technique, and may only use more power intensive position determination techniques if lower power usage techniques are not yielding sufficient results. For example, Table 1 (below) illustrates an order of position determination techniques with a power usage priority:

TABLE 1

| Order | Positioning Technique |
|---|---|
| 1 | Identify Internet Protocol (IP) address of local access point to determine subnet, which gives an approximate location |
| 2 | Trilateration |
| 3 | Hybrid GPS and cellular position determination |
| 4 | GPS |

Alternatively, if the ECD considers position accuracy to be higher in priority than power usage, Table 2 (below) illustrates an order of position determination techniques with a position precision priority:

TABLE 2

| Order | Positioning Technique |
|---|---|
| 1 | GPS |
| 2 | Hybrid GPS and cellular position determination |
| 3 | Trilateration |
| 4 | Identify Internet Protocol (IP) address of local access point to determine subnet, which gives an approximate location |

Of course, it is understood that other aspects of the invention may use other position determination orders, and that Tables 1 and 2 are given for example purposes only. Further, as will be appreciated, the term "location" or "position" is used in a broad manner in this application, such that "location" can indicate either geographic position, or any parameter that is associated or correlated with position. For example, if an ECD can connect to a base station with a known location, the ECD knows that its location is within a coverage area adjacent the base station, even if the precise location of the ECD is not known.

Returning to 330 of FIG. 3, in another example, a connection criterion may include a security level associated for each available connection type. In another example, referring to 330 of FIG. 3, connection criteria may be based on which connection types are actually visible, a current time of day or calendar date, a contract status of the user (e.g., whether the user has a subscription to one or more available connection types, or whether the connection type has a roaming status). In another example, a rule may specify that signal visibility and strength are more important than location when considering WiFi versus just connecting to WAN broadband. In this example, a weighting function can be applied to a metric for signal strength (e.g., signal to interference ratio (SIR) and a metric for location (e.g., a value based on the ECD's current position). Another rule example is to allocate WiFi a higher priority than WAN broadband when out of coverage or when roaming, while allocating WAN broadband a priority than WiFi when in coverage. In this example, parameters such as location or visible systems are then applied to decide if the ECD is in coverage or not and, if not, if any WiFi access point is close enough to give a reliable connection. These rules can be refined further by other factors in a weighting function, such as a cost associated with the WiFi and/or WAN broadband services.

While above-described aspects of the present invention describe specific examples of connection criteria that can satisfy 330 of FIG. 3, it will be appreciated that other aspects of the present invention can be directed to any type of connection criteria established by the user. Alternatively, the connection criteria can be established by a carrier network or service provider.

After determining the one or more connection criteria in 330 of FIG. 3, the ECD determines a dynamic CAPL based on the determined connection criteria, 335. For example, if location is included among the connection criteria, the dynamic CAPL can be a CAPL associated with a geographic region including the location. Alternatively, if security level is included among the connection criteria, the dynamic CAPL may grant, for example, a higher-priority level to secured connections over unsecured connections. In an example, the user (i.e., subscriber), IT department or carrier can determine the connection criteria in a prior configuration step (e.g., prior to the process of FIG. 3) rather than in series with establishing the connection. As will be appreciated, acquiring as much of the information used in the conditional steps of FIG. 3 in advance may decrease the execution time of the process of FIG. 3.

In another example, the dynamic CAPL may limit its listed connections to network connections that are available as determined at the ECD. In this example, if possible, the ECD can search for systems and other parameters in parallel with performing a location fix (e.g., assuming the ECD has sufficient processing resources and separate antennas/RF path for location fixes and searching, or a multiplex configuration via a single antenna). Alternatively, the dynamic CAPL can be determined without taking into accounts the actual available network connections. In this example, an attempt to connect to an unavailable network connection will simply result in an unsuccessful connection attempt at 350 (discussed below).

After the dynamic CAPL is determined at the ECD in 335, a first connection type is obtained from the dynamic CAPL in 340. The first connection type obtained from the dynamic CAPL corresponds to the connection type having the highest priority in the dynamic CAPL. Next, the ECD attempts to establish a network connection via the first connection type, 345. The ECD then determines whether the network connection attempt was successful, 350. If the network connection attempt is determined to be successful, the process advances to 325, which is described above. Otherwise, if the network connection attempt is determined not to be successful, the ECD obtains a next connection type from the dynamic CAPL in 355. The next (i.e., second) connection type obtained from the dynamic CAPL corresponds to the connection type having the next highest priority in the dynamic CAPL as compared to the previous attempted connection type. The process then returns to 345 and a network connection attempt is performed for the next connection type, and so on, until all connection types in the dynamic CAPL are tested or a successful connection is established.

While not illustrated explicitly within FIG. 3, it is understood that the process of FIG. 3 may be repeated in response to one or more triggering events. For example, the triggering events can include a lost network connection, entry into a new geographic region (e.g., the ECD is handed off to a new sector, base on the determined geographic location of the ECD, etc.), a user of the ECD can force a repeat of FIG. 3, etc. In the context of FIG. 3, this means that, from time to time, the ECD may determine whether to establish a new network connection as in 300, and the process of FIG. 3 may begin anew. For example, the triggering events that cause FIG. 3 process repetitions can be configured by the user of the ECD, IT support personnel, and/or a service provider.

Figure 4:
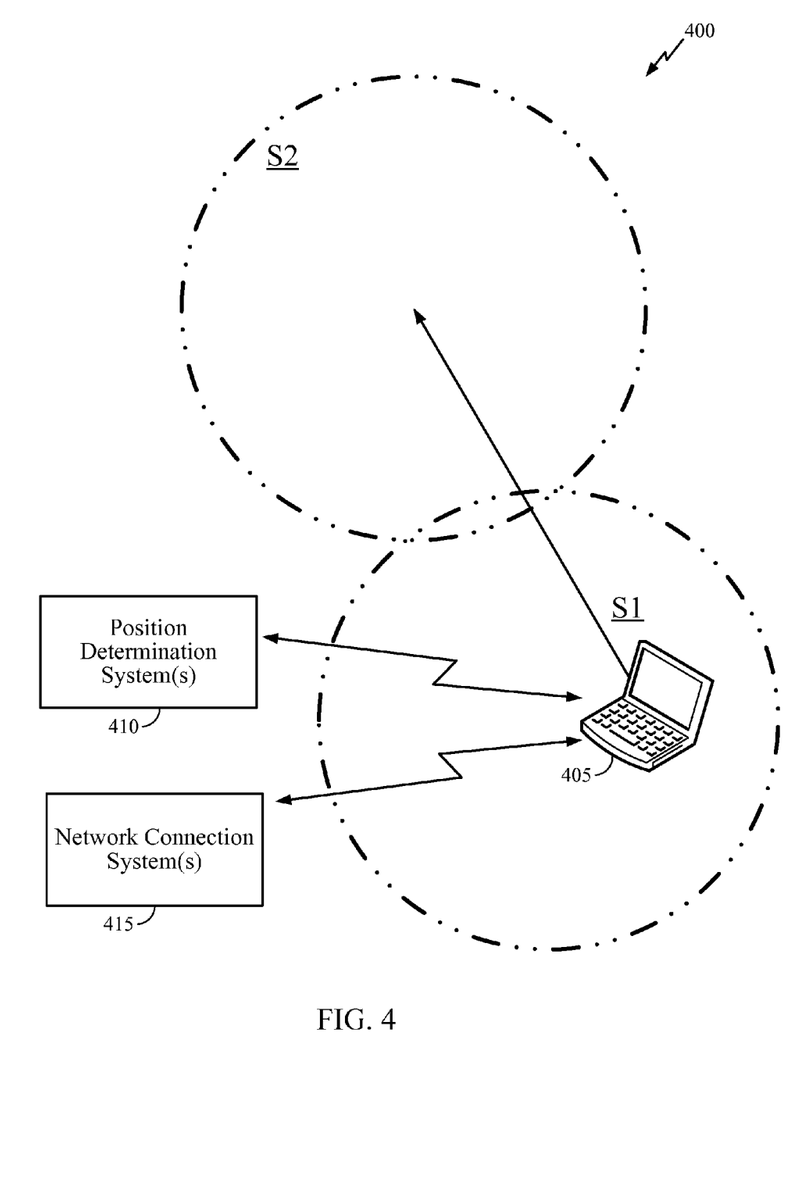
FIG. 4 illustrates a portion of a wireless communications network.

An example of the process of FIG. 3 will now be described with respect to FIG. 4. Similar to FIG. 4 and for comparison purposes, FIG. 4 illustrates a portion of the wireless communication system 400, and includes sectors S1 and S2. Further illustrated in FIG. 4 is an ECD (i.e., laptop computer 405 (see, FIG. 4)) that is traveling from sector S1 to sector S2. For convenience of explanation, assume that the laptop computer 405 can connect to the Internet only via WiFi (e.g., 802.11 a/b) or a cellular broadband connection. Sector S1 supports cellular broadband connectivity, but does not support WiFi. Sector S2 supports both cellular broadband connectivity and free WiFi connectivity.

With the above assumptions, in sector S1, the user of laptop computer 405 determines to establish a network connection, 300, and determines not to manually select a connection type, 305. Next, assume that the user selects the location of the laptop computer 405 as a connection criterion. For example, the user selection of location as a connection criterion can be pre-configured by the user at the laptop computer 405. While not illustrated explicitly within FIG. 3, the laptop computer 405 determines its position using any well-known position determination methodology, such as GPS, trilateration, etc. Next, the laptop computer 405 determines a dynamic CAPL based on the location connection criteria, 340. In an example, the laptop computer 405 can query a pre-configured database that will provide a CAPL for the laptop computer 405 to use for its location. For sector S1, assume that the dynamic CAPL instructs the laptop computer 405 to attempt to establish a cellular broadband connection as a first connection type, 340. In 345, the laptop computer 405 establishes a connection via cellular broadband (350, 325).

Next, the laptop computer 405 enters sector S2 from S1. At this point, the laptop computer 405 re-executes the process of FIG. 3 (e.g., assuming that the sector-change from S2 to S1 is a triggering event that causes FIG. 3 to be repeated). Accordingly, the user of laptop computer 405 determines to maintain its network connection, 300, determines to bypass manual connection type selection, 305, and has pre-configured the laptop computer 405 to use the location of the laptop computer 405 as a connection criterion. The laptop computer 405 again may determines its position using any well-known position determination methodology. Next, the laptop computer 405 determines another dynamic CAPL based on the location connection criteria, 340. For sector S2, assume that the dynamic CAPL instructs the laptop computer 405 to attempt to establish a WiFi connection as a first connection type, 340. In 345, the laptop computer 405 establishes a connection via WiFi (350, 325).

An example will now be provided wherein calendar information (i.e., time of day and day of week) is included among the connection criteria. In this example, assume that a cell phone can make telephone calls over either a Voice over Internet Protocol (VOIP) via local WiFi or through a cellular service provider. Further assume that VOIP is free to the user, that the cellular service is only free at certain times (e.g., during weekends and from 9 pm to 6 am from Monday through Friday) and that both services are comparable in quality.

Accordingly, a user of the cell phone to make a phone call, 300, and determines not to manually select a connection type, 305. Next, assume that the user selects calendar information associated with free cellular service availability as a connection criterion. For example, the user selection of calendar information as a connection criterion can be pre-configured by the user at the cell phone. Next, the cell phone determines a dynamic CAPL based on the calendar connection criteria, 340. In particular, the dynamic CAPL grants VOIP through WiFi a higher priority than cellular service during periods when cellular service is not free, and the dynamic CAPL grants VOIP through WiFi a lower priority than cellular service when cellular service is free. The cell phone then attempts to make the phone call in the order indicated by the dynamic CAPL (345, 350, 325).

An example will now be provided wherein a security level is included among the connection criteria. In this example, assume that a laptop computer includes the ability to connect to WiFi networks (e.g., 802.11a/b/g, 802.16d/e, etc.), and further that the laptop computer includes trade secret information that a user of the laptop computer wishes to protect.

Accordingly, a user of the laptop computer determines to establish a network connection, 300, and determines not to manually select a connection type, 305. Next, assume that the user selects security level of available WiFi networks as a connection criterion. For example, the user selection of security level as a connection criterion can be pre-configured by the user at the laptop computer. Next, the laptop computer determines a dynamic CAPL based on the security level connection criteria, 340. For example, the dynamic CAPL may grant a lowest priority to unsecured WiFi networks, and then grants priority levels to secured WiFi networks based on the how effective their security is expected to be. The laptop computer then attempts to establish the network connection in the order indicated by the dynamic CAPL (345, 350, 325). In a further example, the dynamic CAPL in this example may also affect the nature of the communication in the connection order. For example, if the dynamic CAPL includes a public access point, an additional layer of security can be added to this connection type, for example, such that the ECD can only communicate over the public access point via sufficient encryption (e.g., Wired Equivalent Privacy (WEP), WEP-40, WEP-128, WiFi Protected Access (WPA), etc.).

As will be appreciated from the above examples, the dynamic CAPL permits connection setup to be optimized to a greater degree than an application of a default CAPL. Further, the above examples are provided for illustrative purposes only, and other aspects of the present invention may establish a dynamic CAPL based on any other connection criterion or combination of different connection criteria.

FIG. 4 illustrates a portion of a wireless communication system 400, and includes sectors S1 and S2. Further illustrated in FIG. 4 is an ECD (e.g., laptop computer 405) that is traveling from sector S1 to sector S2, as was discussed above in relation to FIG. 3. It will be appreciated that the ECD 405 of FIG. 4 can communicate with one or more remote systems, such as position determination system(s) 410 and network connection system(s) 415. For example, in S1 the location of ECD 405 may be determined using a satellite positioning system that is part of position determination system(s) 410 and the network connection system(s) 415 may include a WiFi system and/or cellular broadband system that provides network connectivity to ECD 405. However, it will also be appreciated that in various aspects the position information and network connectivity may be derived from one entity (e.g., access point, and/or cellular network). Accordingly, FIG. 4 is merely a functional illustration and the various aspects of the invention are not limited to this illustration.

Likewise, ECD 405 can include various elements which may be realized in a variety of configurations. For example, ECD 405 may include one or more processors coupled to one or more transmitters/receivers for wireless communication with various systems. Further the one or more processors may be coupled to memory, keypad, display, I/O circuits and other circuits that are well known in electronic communication devices and that allow for the functional aspects of the invention described herein to be performed. For example, the logic configured to determine one or more connection criteria associated with connection establishment at the electronic communications device may include logic implemented by the one or more processors of ECD 405 in combination with memory and other devices coupled to the one or more processors. Similarly, the other logical implementations and means for performing the functionality described here may be implemented by various combinations of hardware and/or software available on ECD 405.

Accordingly, it will be appreciated that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of aspects of the present invention.

Further, the methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of establishing a network connection at an electronic communications device, comprising:

determining a location of the electronic communications device;

determining current values of one or more connection criteria associated with connection establishment at the electronic communications device, wherein the one or more connection criteria includes at least one of a current time of day, calendar date or security levels associated with available connection types;

determining which network connections are currently available to provide network access to the electronic communications device at the location of the electronic communications device;

generating a connection acquisition priority list at the electronic communications device based on the currently available network connections and the current values of the one or more connection criteria, wherein the connection acquisition priority list comprises a list of connection types of the currently available network connections supported by the electronic communications device ordered according to priorities of the listed connection types, each connection type of the list of connection types having an associated priority, wherein a Wireless Local Area Network (WLAN) connection type gets higher priority than a Wide Area Network (WAN) connection type when the electronic communication device is roaming and a lower priority than the WAN connection type when the electronic communication device is not roaming;

obtaining a connection type from the connection acquisition priority list; and attempting to establish the network connection having the connection type obtained from the connection acquisition priority list.

2. The method of claim 1, wherein the one or more connection criteria are established at the electronic communications device.

3. The method of claim 1, wherein the one or more connection criteria are received from an external source.

4. The method of claim 1, wherein the attempting attempts to establish the network connection iteratively from a highest-ordered connection type within the connection acquisition priority list to a lowest-ordered connection type within the connection acquisition priority list until a successful connection is established.

5. The method of claim 4, wherein the attempting returns to the highest-ordered connection type from the lowest-ordered connection type, based on no connection being established after the lowest-ordered connection type is attempted.

6. The method of claim 1, wherein the location is determined by at least one of which access points (APs) are observable to the electronic communications device, a satellite positioning system location estimate, network trilateration or a subnet associated with an internet protocol (IP) address of an observable gateway.

7. The method of claim 1, wherein generating the connection acquisition priority list is limited to network connections determined to be currently available at the electronic communications device.

8. The method of claim 1, further comprising:
repeating the determining, the generating and the attempting.

9. The method of claim 8, wherein the repeating is performed in response to a triggering event.

10. The method of claim 9, wherein the triggering event is one of losing an established network connection, entering a new geographic region or receiving a manual trigger at the electronic communications device.

11. An electronic communications device, comprising:
means for determining a location of the electronic communications device;

means for determining current values of one or more connection criteria associated with connection establishment at the electronic communications device, wherein the one or more connection criteria includes at least one of a current time of day, calendar date, or security levels associated with available connection types;

means for determining which network connections are currently available to provide network access to the electronic communications device at the location of the electronic communications device;

means for generating a connection acquisition priority list based on the currently available network connections and the current values of the one or more connection criteria, wherein the connection acquisition priority list comprises a list of connection types of the currently available network connections supported by the electronic communications device ordered according to priorities of the listed connection types, each connection type of the list of connection types having an associated priority, wherein a Wireless Local Area Network (WLAN) connection type gets higher priority than a Wide Area Network (WAN) connection type when the electronic communication device is roaming and a lower priority than the WAN connection type when the electronic communication device is not roaming;

means for obtaining a connection type from the connection acquisition priority list; and means for attempting to establish a network connection having the connection type obtained from the connection acquisition priority list.

12. The electronic communications device of claim 11, wherein the means for attempting attempts to establish the network connection iteratively from a highest-ordered connection type within the connection acquisition priority list to a lowest-ordered connection type within the connection acquisition priority list until a successful connection is established.

13. The electronic communications device of claim 12, wherein the means for attempting returns to the highest-ordered connection type from the lowest-ordered connection type, based on no connection being established after the lowest-ordered connection type is attempted.

14. The electronic communications device of claim 11, wherein the location is determined by at least one of which access points (APs) are observable to the electronic communications device, a satellite positioning system location estimate, network trilateration, or a subnet associated with an internet protocol (IP) address of an observable gateway.

15. The electronic communications device of claim 11, wherein the means for generating the connection acquisition priority list limits the connection acquisition priority list to the network connections determined to be currently available at the electronic communications device.

16. A non-transitory computer-readable medium comprising instructions, which, when executed by an electronic communications device within a wireless communications system, cause the electronic communications device to perform operations, the instructions comprising:
program code to determine a location of the electronic communications device;

program code to determine current values of one or more connection criteria associated with connection establishment at the electronic communications device, wherein the one or more connection criteria includes at least one of a current time of day, calendar date, or security levels associated with available connection types; program code to determine which network connections are currently available to provide network access to the electronic communications device at the location of the electronic communications device;

program code to generate a connection acquisition priority list based on the currently available network connections and the current values of the one or more connection criteria, wherein the connection acquisition priority list comprises a list of connection types of the currently available network connections supported by the electronic communications device ordered according to priorities of the listed connection types, each connection type of the list of connection types having an associated priority, wherein a Wireless Local Area Network (WLAN) connection type gets higher priority than a Wide Area Network (WAN) connection type when the electronic communication device is roaming and a lower priority than the WAN connection type when the electronic communication device is not roaming;

program code to obtain a connection type from the connection acquisition priority list; and program code to attempt to establish a network connection having the connection type obtained from the connection acquisition priority list.

17. The non-transitory computer-readable medium of claim 16, wherein the program code to attempt attempts to establish the network connection iteratively from a highest-ordered connection type within the connection acquisition priority list to a lowest-ordered connection type within the connection acquisition priority list until a successful connection is established.

18. The non-transitory computer-readable medium of claim 16, wherein the location is determined by at least one of which access points (APs) are observable to the electronic communications device, a satellite positioning system location estimate, network trilateration or a subnet associated with an internet protocol (IP) address of an observable gateway.

19. The method of claim 1, further comprising:

prompting a user of the electronic communications device to indicate whether manual selection of a target network for attempting network acquisition of the network connection is preferred, wherein determining the current values, the generating and the attempting are performed in response to the user indicating the manual selection responsive to the user prompt.

20. The method of claim 1, wherein the electronic communications device determines a current value of at least one connection criteria before or concurrently with the determining to attempt establishment of the network connection.

21. The method of claim 1, wherein the available connection types comprise one or more of an Internet connection, a wired phone line connection, a wireless cellular phone line connection, a wireless local area network connection, and/or a connection between local wired or wireless peripheral devices.

22. The method of claim 1, wherein the obtaining comprises:

obtaining the connection type from the connection acquisition priority list having a highest priority connection type.

23. The method of claim 1, wherein the one or more connection criteria comprise criteria related to selection of a connection type of the list of connection types.

* * * * *